Oct. 19, 1937. O. H. CILLEY 2,096,692
FRICTION MEMBER AND PROCESS OF MAKING THE SAME
Filed May 21, 1936 3 Sheets-Sheet 1
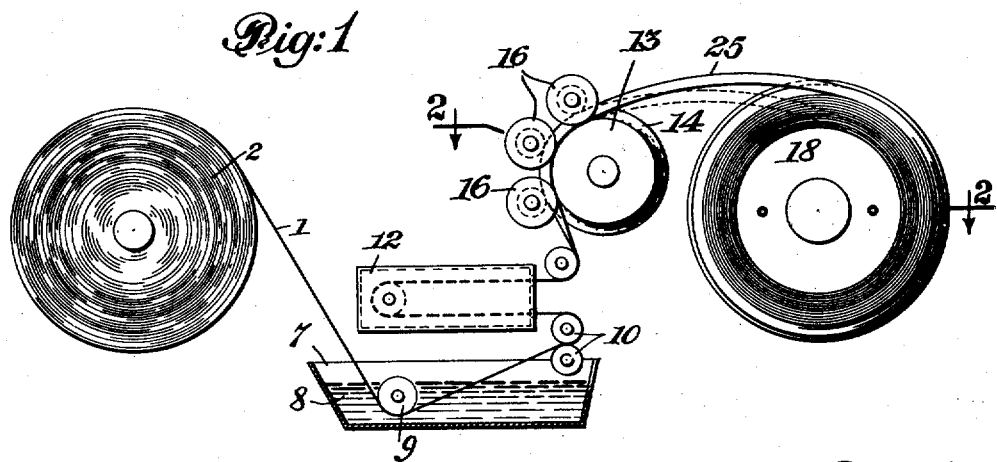
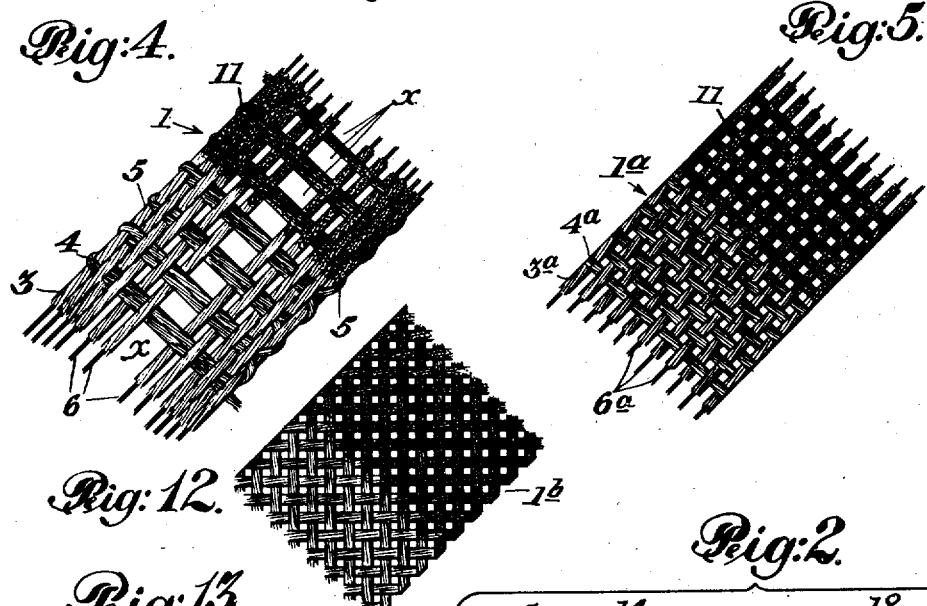
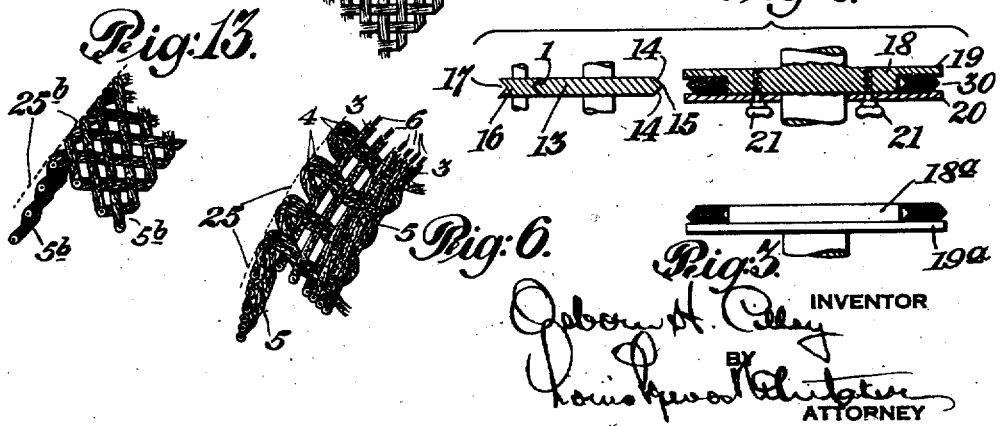

Oct. 19, 1937.   O. H. CILLEY   2,096,692
FRICTION MEMBER AND PROCESS OF MAKING THE SAME
Filed May 21, 1936   3 Sheets-Sheet 2
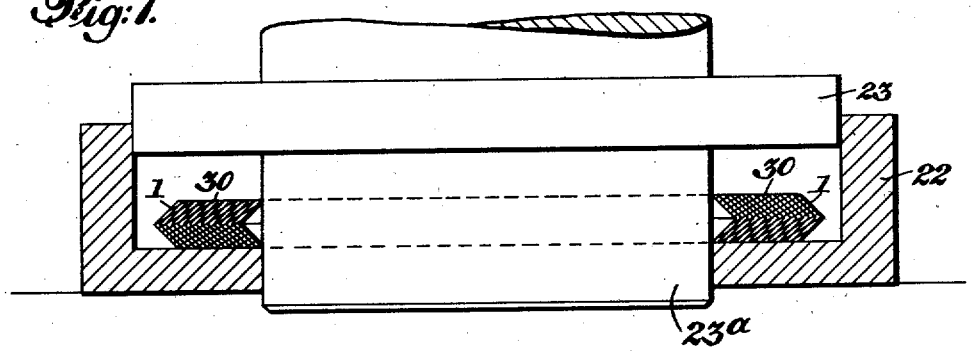
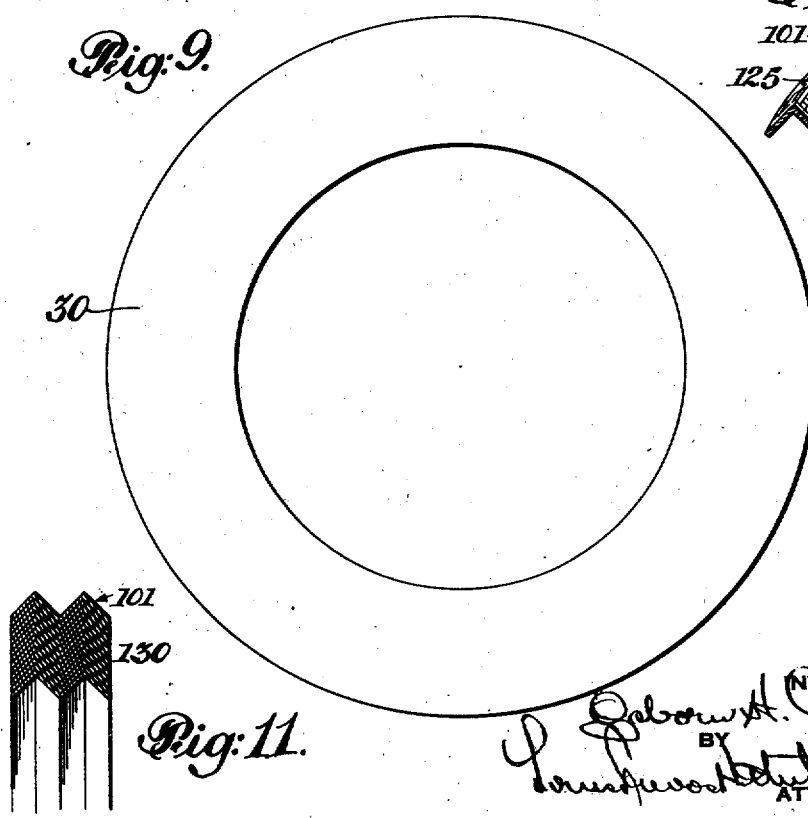

Oct. 19, 1937.  O. H. CILLEY  2,096,692
FRICTION MEMBER AND PROCESS OF MAKING THE SAME
Filed May 21, 1936  3 Sheets-Sheet 3
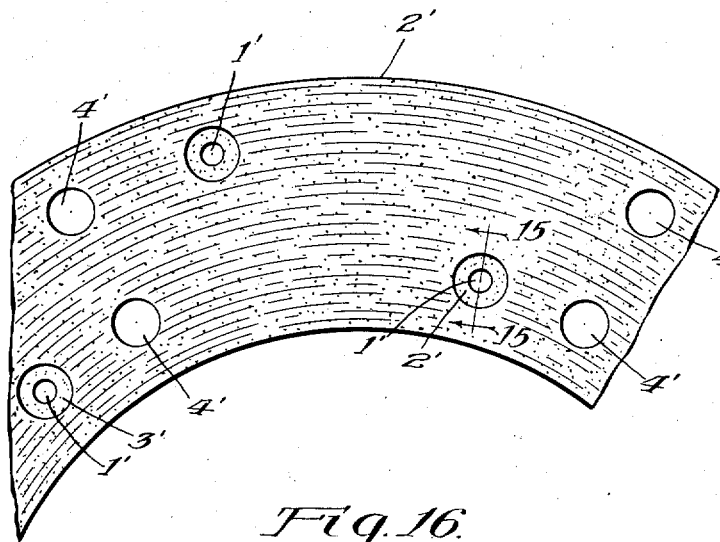
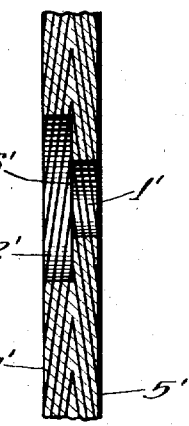
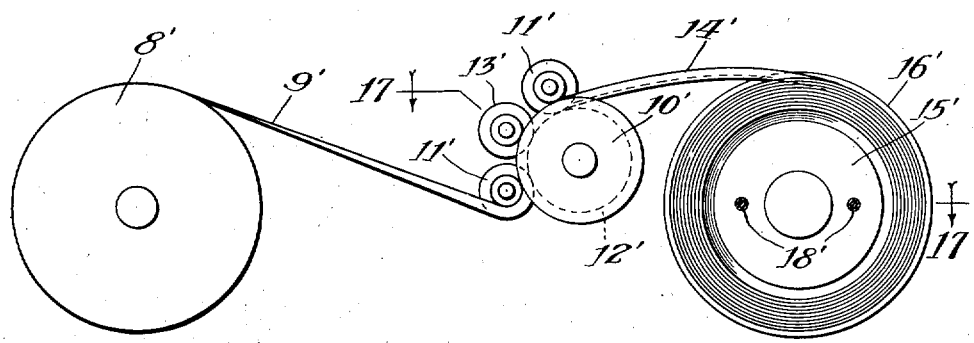
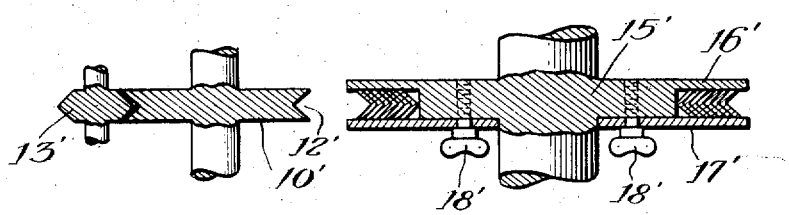
Inventor:
Osborn H. Cilley,
By: Lee J. Gary
Attorney Patented Oct. 19, 1937

2,096,692

UNITED STATES PATENT OFFICE 2,096,692

FRICTION MEMBER AND PROCESS OF MAKING THE SAME

Osborn H. Cilley, Lancaster, Pa., assignor to Raybestos-Manhattan, Inc., Passaic, N. J., a corporation of New Jersey Application May 21, 1936, Serial No. 81,136

14 Claims. (Cl. 154—2)

This application is a continuation-in-part of my co-pending application, Serial No. 50,713, filed November 20, 1935.

This invention relates to improvements in endless friction facings, friction discs or rings and a method of making the same, and refers specifically to improved endless friction facings or rings characterized by relatively high tensile and bursting strength which make them ideally adaptable for automobile clutch facings.

In the use of friction facings, such as clutch facings for automobiles or the like, and especially those used in conjunction with engines which develop high rotative speeds, endless facings have decided advantages. In view of the high rotative speeds the facings are subjected to relatively great centrifugal force which, in many instances, is sufficiently great to tear or disrupt the facing. Facings other than those of the endless type, that is, those which are provided with a radial joint, are frequently unsuitable when used at high rotative speeds since the centrifugal force tends to and frequently succeeds in rupturing the facing at the joint.

It has heretofore been proposed to produce endless clutch facings, that is, clutch facings without radial joints, by die-cutting annular laminae from sheets of woven fabric and building up the facing from the annular plies so cut. However, this process is relatively costly since the centers and outer bordering portions are wasted. Consequently, endless friction facings of this type are, in many instances, economically impractical.

An object of my invention resides in the provision of an endless friction facing construction, which is economical since the process of making the same is characterized by the absence of material waste, and in addition the facing construction is such that, although built up of spiral convolutions of a continuous strip of fabric, no planes of cleavage extend or project from one face of the facing to the opposite face thereof.

The process of my invention briefly described comprises folding a previously impregnated or frictioned strip of fabric longitudinally into chevron or V-shape cross section while simultaneously imparting a longitudinal curvature thereto, winding the V-shaped strip upon a suitable mandrel in spiral fashion whereby the interior surface of one coil fits or nests with the exterior surface of the preceding coil. The resulting structure is subjected to heat and pressure sufficient to plasticize the binder, the temperature, however, being below that which would render the binder infusible. The friction facing is thus brought to approximate size and shape and is then cured in the usual manner to render the binder substantially infusible and is finally rough sanded, fine sanded and drilled to provide rivet holes therein.

Other objects and advantages of my invention will be apparent from the accompanying drawings and following detailed description.

In the drawings, Fig. 1 is a schematic representation of one form of apparatus which may be employed to carry out my invention, one side blade of the mandrel being removed.

Fig. 2 is a horizontal section on line 2—2 of Fig. 1.

Fig. 3 is a detail of a modified form of mandrel for use in a horizontal position.

Fig. 4 is an enlarged detail of a form of woven asbestos tape which I may employ, a portion of which is shown as impregnated with a binder.

Fig. 5 is a similar view of a strip formed of woven asbestos cloth similarly treated.

Fig. 6 is a detail of the tape shown in Fig. 4, bent or folded longitudinally into chevron form in cross section and curved longitudinally.

Fig. 7 is an enlarged view of the spirally wound coil and appropriate dies for compressing the same transversely.

Fig. 8 is a sectional view of a completed clutch facing.

Fig. 9 is a plan view of the same.

Fig. 10 is a detail sectional view of a strip of impregnated friction fabric folded longitudinally to form two inverted V or chevron portions and curved longitudinally.

Fig. 11 is a partial sectional view of a built up ring or annulus formed of spirally wound coils or layers of tape or strip pre-formed as illustrated in Fig. 10.

Fig. 12 is a view similar to Fig. 5 showing a strip of woven cloth cut on the bias.

Fig. 13 is a view similar to Fig. 6 showing the bias strip folded longitudinally into chevron form and curved longitudinally.

Fig. 14 is a fragmentary face view of a finished friction facing provided with rivet holes.

Fig. 15 is an enlarged sectional view taken on line 15—15 of Fig. 14.

Fig. 16 is a diagrammatic side elevational view of apparatus suitable for making a modified form of friction facing.

Fig. 17 is a plan sectional view taken on line 17—17 of Fig. 16.

Fig. 1 represents diagrammatically one form of apparatus which may be employed to carry out my improved process and produce my improved facing. In this figure, 1 represents a flat strip or tape which may be conveniently wound in a coil 2. The strip 1 is preferably loosely woven of warp threads and wefts or fillers of asbestos yarns and may be a special tape as indicated in Fig. 4 in which the warps are designated at 3 and the wefts or filler threads at 4, or a strip cut from a wider piece of asbestos cloth or fabric, as indicated in Fig. 5 at 1a, in which the warps are indicated at 3a and the wefts or fillers at 4a. Where the special tape (Fig. 4) is used, it possesses an advantage in that it has a selvage at each edge, as indicated at 5, and if a special tape is woven for the purpose, I preferably either omit a central warp or warps, or so space the warps as to provide a wider space between adjacent warps along the longitudinal center of the tape as clearly indicated at X—X in Fig. 4 so that when the tape is bent or folded longitudinally in inverted V or chevron form in cross section, and curved longitudinally, it takes the curvature very readily as there is no central warp to be stretched. This is clearly shown in Fig. 6. I have found, however, that very good results are obtained with the use of a strip of asbestos cloth (Fig. 5) with a slight reduction in cost, and where strips of cloth are used, it is customary to weave the cloth of any desired width, preferably a multiple of the desired width of the strip, which cloth is then wound on a mandrel and subsequently severed in any well known manner into a plurality of coils or strips of desired width.

I wish it to be understood that in preparing the strip the yarns can be made of asbestos fibers mixed with any other fibers as cotton, wool, linen or jute, and also that in weaving the tape or cloth additional reinforcing threads or strands of any of said fibrous material may be used for certain warp or filler yarns if found desirable. I also wish it to be understood that any of the yarns may have fine metal wires of brass, copper, zinc, lead or other metal, as is usual in making up brake linings, clutch facings or the like, to add to the tensile strength of the asbestos yarn and also to affect the coefficient of friction, or to prevent scoring metallic parts engaging a face of the annulus or clutch facing. I have indicated such wires on the warp threads at 6, Fig. 4, and 6a, Fig. 5, but they may be used in the filler threads or both.

Prior to constructing the friction facing the tape from which the facing is ultimately constructed is saturated, impregnated, or frictioned with a suitable binder. I have shown, in Fig. 1, a reservoir 7 containing a liquid binder 8, the reservoir being provided with one or more guide rolls 9 (one being shown) for carrying the strip below the surface of the impregnant and with squeeze rolls 10 to remove excess liquid. The binder may be of any desired material suitable for the purpose, such as rubber, synthetic resin or drying oils, for example, or a combination of two or more such materials, in association with a suitable solvent, and in association, if desired, with any of the well known solid filler materials in powdered form, as for instance, finely divided metal powder or non-metallic filler, or other organic or inorganic material conventionally added to friction elements to control or affect the coefficient of friction or more perfectly adapt the friction facing to its intended use.

If desired, instead of saturating or impregnating the strip, a web of suitable loosely woven fabric may be passed between frictioning rolls wherein a suitable thermo-plastic binder may be frictioned on the fabric, that is, said binder may be rubbed or literally squeezed into the interstices of the fabric. The binder whether applied as a saturant or impregnant or frictioned on to the tape or fabric, is preferably one which can be rendered plastic by moderate heat and which can be subsequently rendered substantially infusible during the curing operation. Of course any binder may be employed which has the capability of being hardened or rendered infusible, sufficient for friction lining usage, by heat, although, as herein stated, I especially recommend a binder, such as rubber, synthetic resin, or drying oils, for example, of the type well known in the art and which are thermoplastic in nature so that they are plasticized in the mold as the convolutions are being consolidated and are later hardened, to a desirable extent, by continued heat, either in the mold or after they have been removed therefrom and placed, for example, in an oven. In any event, the binder is "hardened" or "rendered infusible" or "set" in the friction element to an extent sufficient to permit the practical use of the friction element. For automobile clutch facings it is preferable that the binder constitute approximately 50% of the finished facing by weight whether the binder is applied by impregnation, saturation or by frictioning. It is to be understood, therefore, that although my invention will be described in conjunction with a fabric which is saturated or impregnated with the binder, it may be found more desirable to apply the binder by frictioning.

In Figs. 4 and 5 I have shown portions of the strips 1 and 1a impregnated as herein described, the impregnated portions being indicated at 11. After impregnation the strip is dried in any convenient manner, and I have diagrammatically indicated in Fig. 1 a dryer or drying chamber 12 through which the impregnated strip is passed, being guided by suitable rollers.

The dried impregnated fabric strip is then folded longitudinally to form an inverted V-shaped cross section, which for convenience is herein designated chevron shape, and simultaneously the strip is given a longitudinal curvature as indicated at 25 in Fig. 1 approximately corresponding to the curvature of the mandrel upon which it is wound or built up. In Fig. 1 I have shown for this purpose a large roll 13 having its peripheral portions chevron shape in cross section, forming two inclined lateral faces 14 meeting in a central edge 15 (see Fig. 2). Around the periphery of this roll I have shown a plurality of grooved rollers 16 on one side of the axis of the main roll 13, each having a V-shaped groove or slot in its peripheral face. The impregnated or frictioned strip is led between the roll 13 and rollers 16 and is thus given the chevron form in cross section, and at the same time a longitudinal curvature is imparted thereto. As the strip passes between roll 13 and rollers 16, it will be elongated centrally at the ridge portion or it may be somewhat compressed longitudinally or shortened along the edges or both. This has the effect of placing the curved chevron strip in a state of tension in which under any circumstances the outer edge, which will be the central portion of the strip, will be under a longitudinal strain or tension while the inner edge portions of the lateral parts of the strip may also be under a certain degree of compression. In any event, after it leaves the forming rolls it will be in the form of an inverted V-shaped channel the central portion or ridge of which is actually longer than the marginal edges, and will retain this form by reason of stiffness imparted to it by the binder. The strip so formed is immediately wound on a suitable mandrel 18 in spiral fashion and the sloping side portions of each layer will lay upon and extend partly over the side portions of the preceding layer. The winding is thus continued until an annulus is built up of the required radial thickness.

During the winding operation it is essential that the strip 25 be not maintained in too great a degree of tension since it is desirable that the annulus so wound comprises a relatively loosely constructed spiral. Preferably the winding tension is such that the convolutions will retain their position in the resulting annulus so as to permit subsequent handling thereof.

As indicated in Figs. 1 and 3 the mandrel is provided with lateral flanges or plates 19, 20, one of which (20) is detachable to facilitate the removal of the coiled chevron section annulus and is held in place by thumb screws 21. In some instances the forming rollers and mandrel may be arranged in a horizontal plane, in which case, as indicated in Fig. 3, the mandrel 18a may be provided with a guiding flange or plate 19a on its lower face only and when the desired thickness of the annulus is obtained the strip is cut and the annulus is lifted from the mandrel. In winding the chevron section strip upon the mandrel 18a, it is preferable that the convolutions or coils of the spiral be relatively loosely nested, the tension of the strip being so maintained as to permit the resulting annulus to be subsequently handled without unwinding.

The coiled strip or annulus is then subjected to great pressure, preferably hydraulic pressure, in a direction parallel to its axis (or transversely with respect to the chevron section strips). It is preferable, during the pressing operation, that the annulus be subjected to heat sufficient to plasticize the binder or cause the same to flow. The pressing operation may be conveniently effected, as indicated in Fig. 7, in suitable dies placed in a hydraulic or other type press. In this figure the coiled or built up annulus is indicated at 30, and is placed in an annular female die 22 and supported in the press and is acted upon by the male die 23 which has a projecting guiding portion 23a on its lower face engaging the central aperture of the female die. The annulus is compressed into the form indicated in Figs. 8 and 9 thereby providing a compact mass of predetermined size and annular shape, the inner and outer peripheral edges being brought into parallelism with the axes. The degree of pressure is preferably such that all voids are substantially eliminated, that is, the mass is subjected to substantially its limit of pressure. By heating the binding material simultaneously with the application of pressure, the layers or convolutions will be firmly united by said binding material and the overlapping side portions of the chevron section strips will be firmly compressed together and the warp threads (which will extend circularly around the flat ring or annulus) and the weft threads (which will extend radially thereof) of each layer, will be intimately interlocked with and between the corresponding threads of adjacent layers.

To facilitate the interlocking of the warps and wefts or fillers of adjacent coils, I usually prefer to make the strip or tape of somewhat loosely woven material as indicated in the drawings. This reinforces the structure so that it will resist strains or stresses which tend to separate the layers and it will be a substantial impossibility that any wear to which the annulus is subjected in use can ever separate the layers so as to make a cleft or opening between them extending through the ring from one face to the other. By loosely winding the coils or convolutions to build up the annulus, each coil, during the winding and subsequent pressing and heating operation, will be free to assume, what may be termed, its natural position whereby the resulting facing will be of uniform density. If the facing were originally wound relatively taut, difficulty would be encountered in that portions of the facing would be more dense than other portions thereof. In some instances I prefer to subject the coil or annulus to the action of pressure only which under certain conditions will suitably compact the mass. However, it is to be understood, of course, that my invention broadly contemplates either the application of pressure alone or the simultaneous application of heat and pressure.

After the coil has been compressed (preferably within a confining mold as previously described) with or without heat treatment while in the mold, or during compression and consolidated, it may, if necessary, be subjected to a further curing step wherein the binder is cured to a substantially infusible state, at least infusible with regard to the temperature which the facing will ordinarily encounter in practice. However, as herein indicated, the heat in the mold may be continued until the binder has been hardened sufficient for the friction lining usage or, if desirable, as stated, it may, in some instances, be desirable to heat harden the binder by subjecting it to oven treatment after it has been removed from the mold. After the curing step the annulus may be ground on one or both of the opposite lateral faces for the purpose of bringing it to substantially uniform thickness and also to bring to the surface portions of the metallic wires, if such are used or other special ingredients incorporated with the binder for the purpose of rendering the friction surface or surfaces substantially uniform in character. It is preferable that the annulus be subjected to a rough sanding and thence a smooth sanding operation. This, of course, constitutes the grinding step. It will be noted that the method of producing the annulus necessarily results in producing a substantially uniform density throughout, which is extremely important in the use of the device for friction purposes, as for example, in clutch facings.

While I have shown and described the formation of an annulus, I wish it to be understood that by using a sufficiently small mandrel a perfect disc of this construction can also be formed if it should be desirable.

The thickness of the disc or annulus can obviously be varied within limits by correspondingly varying the thickness of the strip or tape from which it is constructed. In addition, the thickness of the annulus or disc can be varied by maintaining the thickness of the strip or tape constant and increasing or decreasing the width of the tape or strip to increase or decrease the thickness of the annulus or disc. Where an exceptionally thick disc is desired I may provide a relatively wider strip and fold it longitudinally so as to form two or more chevron or inverted V-shaped portions simultaneously curving the entire strip in a longitudinal direction as hereinbefore described, thus, in Fig. 10 I have shown an impregnated or frictioned strip at 101, having two chevron-shaped portions extending longitudinally thereof and curved longitudinally of the strip, as indicated at 125, and in Fig. 11 I have illustrated a portion of an annulus 130 formed by spirally winding the strip illustrated in Fig. 10 spirally upon a mandrel and before compressing it, the annulus so formed may be subjected to pressure and heat sufficient to plasticize the binder in suitable confining dies or molds in the same manner as previously described with the result that a much thicker annulus or disc would be formed than would be the case if a single chevron-shaped fold were made in a narrower strip.

In some instances, and in order to facilitate the folding of the strip into chevron form in cross section and imparting to it the longitudinal curve at the apex of the chevron, I find it desirable to form the strip by cutting it on the bias from a larger piece of woven cloth as indicated at 1b in Fig. 12. When the strip is so cut, the warp and filler yarns will lie at an angle of approximately 45° to the longitudinal edges of the strip. It will therefore be seen that when the strip 1b which is impregnated or frictioned in the manner hereinbefore described is folded longitudinally into the chevron shape cross section, none of the warps will run parallel to the longitudinal apex of the chevron shaped strip, but on the contrary both warps and fillers will be disposed angularly thereto so that as the bias strip is folded longitudinally, the curvature longitudinally at the line of fold, which is indicated at 25b in Fig. 13, can be readily imparted without the necessity of longitudinal stretching of any of the warps on the one end, or compressing any of the warps at the longitudinal edges indicated at 5b in Fig. 13, as the entire strip can readily accommodate itself to the curvature indicated at 25b by a mere readjustment of the diagonally extending warps and fillers of the bias strip with respect to each other. Therefore, there is less danger of producing a puckering effect along the longitudinal edges of the strip and the curvature is imparted to the folded strip more readily.

The operation of building up the spiral coil with the strip shown in Figs. 12 and 13 and the subsequent steps of heating and compressing, curing and sanding, will be the same as those previously described.

Of course, with the bias form of strip, when formed into a spiral coil, the filler threads will not extend radially but angularly to the radii and the warp threads will not extend around the coil parallel to the outer and inner edges thereof as in the case of the forms of strip previously described, but will lie angularly to the radii. Nevertheless, when the coil of tape is subjected to heat and pressure as previously described to consolidate the overlapping portion of the impregnated or frictioned strip into a practically solid mass, it is found that a sufficient interlocking of the warps or fillers of the lateral portion of each layer with the corresponding lateral portion of adjacent layers is effected by the pressing and heating operation so that there is no possibility of the layers separating from each other in use. Moreover, the layers are all held upon each other throughout the structure of the coil by the spiral form of the coil and the inter-engagement or inter-nesting of the external angular face of each layer with the internal angular face of the next layer.

After the annulus has been initially heated and subjected to pressure and subsequently cured and sanded, a plurality of rivet holes 1' are drilled in the facing, when the device is adapted to be used as an automobile clutch facing. The holes 1' are adapted for the reception of attaching rivets whereby the facing 2' is secured to a clutch plate (not shown). The holes 1' may be provided with counterbores 3' in which the heads of the rivets are adapted to be positioned. It is customary to bore the holes 1' and counterbores 3' in a staggered manner around the circumference of the facing. Many clutch plates are provided with springs whereby clutch engagement is rendered more uniform. These springs are attached to the clutch plate by means of rivets, the heads of which extend outwardly from the surface of the plate. In order that the facing 2' may be positioned in a flat position upon the clutch plate, a series of holes 4' are drilled in the facing to accommodate the heads of the rivets carried by the clutch plate. It can readily be seen that by drilling a plurality of holes 1' and 4' in the body of the facing, said facing is materially weakened and due to the fact that the facing is normally rotated at relatively high speeds and is consequently subjected to considerable stress caused by the centrifugal action, many facings constructed in accordance with the prior art fail. This failure usually exhibits itself by cracks which extend either circumferentially from a hole 4' to an adjacent hole 1', or radially from a hole 4' to an adjacent hole 4'. This type of failure is quite pronounced in spirally wound facings wherein the coils comprising the spiral consist of asbestos covered wire or flat asbestos or fabric tape. In either case incipient or potential planes of cleavage are provided from one face to the opposite face of the facing and it has been found that centrifugal stress tends to separate the layers or coils along these planes particularly between, for instance, a hole 4' and an adjacent hole 1' upon the same arc.

Referring particularly to Fig. 15, an enlarged sectional view is illustrated which brings out the relative positioning of the constitutent coils comprising the facing. As can be readily seen, the tapes when initially folded longitudinally in the manner for instance as shown in Fig. 1, are so folded as to provide a relatively large angle included between the sides of the tape comprising the V or chevron. Of course, when the annulus is compressed, this included angle is diminished and the lateral edges of the coils are thereby disposed along lines which approach parallel positions with respect to the plane of the disc. It can readily be seen, therefore, that such a construction is devoid of any incipient or potential planes of cleavage which may extend directly from one face of the facing to the opposite face thereof. As an example, if the convolution designated 5' terminates as indicated at one face of the facing, the juncture of said convolution with the two adjacent convolutions extends upwardly into the body of the facing until the apex of the chevron is reached which is designated at 6'. Thence the convolution and also the planes of juncture between said convolution and the adjacent inner and outer convolutions extend downwardly to a point on the opposite face of the facing designated at 7'. It can readily be seen, therefore, that the area of bond between one chevron convolution and the adjacent inner and outer chevron convolutions is relatively great and at no time is there a possibility of the facing cracking from a given point on one face, for instance at 5', to a given point on the opposite face such as at 7', the crack extending directly through the facing.

Referring particularly to Figs. 16 and 17, apparatus is illustrated for constructing a slightly modified form of facing. The reference numeral 8' designates a coil of suitable fabric which may be either impregnated or frictioned with a binder which can be plasticized by heat and subsequently cured as has been hereinbefore described. A strip 9' of such tape may be drawn from the roll 8' and may be passed around a portion of roll 10' between the periphery of said roll and the peripheries of a series of rolls 11'. The roll 10', as clearly shown in Fig. 17 at 12' is provided with a V or chevron shaped peripheral surface and the peripheral edges of rolls 11' are formed with registering wedge shaped sections as shown at 13' in Fig. 17. In so passing between roll 10' and rolls 11', the strip 9' is folded longitudinally in conformity with the registering peripheries of rolls 10' and 11'. However, in this form of my invention the open side of the folded strip extends upwardly as opposed to the arrangement illustrated in Fig. 1 wherein the open portion of the folded strip extends downwardly. Simultaneously with imparting said longitudinal fold the strip is given a longitudinal curvature as indicated at 14' in Fig. 16. The longitudinally folded and curved strip 9' is then spirally wound upon a suitable mandrel 15' which is provided with radially extending flange 16' and said folded or chevron shaped spirals are confined between said flange 16' and plate 17' which may be secured to the mandrel 15' by means of wing nuts 18'. It can readily be seen that the facing body or annulus built up in this fashion is constructed in an inverse manner to the construction of the annulus formed on the device shown in Fig. 1, that is, the open portion of the chevron shaped strips or coils extends outwardly. Similar to the construction heretofore described, the annulus with the inversely positioned coils is initially wound relatively loosely and is subsequently placed in a suitable mold and subjected to pressure and heat sufficient to plasticize the binder and compact the coils. The compressed annulus may then be cured, sanded, and if used as an automobile clutch facing, drilled. All of the inherent features and advantages described in conjunction with the preferred embodiment are existent in this modification.

As an example of my process, relatively loosely woven cloth approximately 40 inches wide is either fed through one or more saturating vats or frictioned to secure an increase of approximately 100% by weight, i. e., the treated cloth consists of about 50% cloth and 50% binder solids. Strips ½ inch to ¾ inch wide are cut from the sheet. In accordance with the procedure hereinbefore described, the strips are longitudinally creased or folded into V or chevron shape and longitudinally curved and then loosely internested in spiral manner. The loosely internested structure is then hot press molded from a thickness greater than approximately ½ inch to a thickness of about 1/8 inch or lower for approximately five minutes at a temperature of about 350° F., and under about 2200 pounds per square inch pressure. Of course, the length of the strip of tape making up the structure gives a definite weight to the facing.

After the initial hot press molding the facing is cured in the usual manner for from six to ten hours at a temperature ranging from 350° F. to 450° F., after which the cured facing is rough sanded, fine sanded and the rivet holes drilled therein.

Annular clutch facings constructed in the above manner and having the following dimensions 9⅞ inches outside diameter, 6⅛ inches inside diameter and .125 inch thickness were tested for tensile strength on a Riehle tensile machine and gave a range of tensile strengths between 500 and 1200 pounds. In testing the same samples for Brinell hardness using a ¾ inch diameter flat plunger and a 3,000 kg. load, depressions ranging from .009 to .015 inch were recorded. Using a 10 mm. diameter ball and a 500 kg. load Brinell hardness values were recorded between 19.17 and 29.48.

On a standard spinning test up to 8200 R. P. M., at 520° F., the facing will not fracture and become dislodged from the supporting plates being held by rivets. Present day high speed automobile engines have a maximum R. P. M. of about 4500, 3700 below the spinning test above referred to. It is obvious therefore, that the product of my invention is ideally adapted for automobile clutches.

Of course, the above examples and tests are not to be construed as limitations, since they are merely set forth for purposes of illustration, making the nature of my process and character of my resulting product more apparent.

In carrying out my invention, either as suggested by the arrangement in Fig. 1 or the arrangement shown in Fig. 16, a continuous strand of metal wire or fibrous cord may be wound simultaneously with the winding of the annulus, the wire or cord being so disposed relative to the chevron shaped strip as to be included at the apex of the angle formed by the chevron convolutions. This arrangement obviously materially reinforces the structure.

Instead of boring or drilling the counterbores 3' which are to permit the countersinking of the attaching rivets, said counterbores may be provided during the pressing operation, that is, indentations may be formed during said pressing operation at the points where the rivet holes 7' are subsequently to be drilled. This manner of forming the counterbores is not illustrated in the drawings but will be readily understood by any one skilled in the art.

I claim as my invention:

1. A method of making friction facings which comprises folding a strip of fabric treated with a thermo-setting binder in a thermo-plastic condition into chevron form in cross section, winding said folded strip in spiral fashion to form a coiled annulus, subjecting said coil to heat and pressure to consolidate said convolutions and plasticize said binder, and curing said consolidated coil to render said binder substantially infusible.

2. The method of forming clutch facings, which consists in forming a spirally coiled annulus of successive layers of fabric strip treated with a thermo-setting binder in a thermo-plastic condition, said strip being folded longitudinally into chevron form in cross section, subjecting the coil to pressure in a direction transversely to said layers and parallel to the axis of the coil to consolidate said layers, simultaneously subjecting said coil to heat to plasticize the binder, and subsequently curing said consolidated coil and binder.

3. A method of making friction facings which comprises, folding a strip of fabric treated with a suitable thermo-setting binder in a thermoplastic condition into chevron form in cross section, loosely winding said folded strip in spiral fashion to form a loosely coiled annulus, subjecting said coil to heat and pressure to plasticize the binder and consolidate the convolutions of the coiled annulus, and curing said coil to set the binder.

4. A friction element comprising a spiral coil of binder-treated fabric folded longitudinally into chevron form in cross section, the lateral portions of the successive layers being disposed at an acute angle to the faces of said element, the coil being compressed and the binder cured to a substantially infusible state.

5. A friction element comprising a spiral coil of binder treated fabric folded longitudinally into chevron form in cross section, the lateral portions of the successive layers being disposed at an acute angle to the faces of said element, whereby no potential or incipient planes of cleavage are provided directly through the body of the element, the coil being compressed and the binder cured to a substantially infusible state.

6. The method of making endless friction facings which comprises winding a strip of fabric, treated with a heat hardenable binder, and having previously shaped recessed and projecting portions on opposite sides thereof into a body such that the projections of the fabric nest with recesses of adjacent convolutions and subjecting the body to pressure to compact the convolutions thereof into a substantially rigid friction facing and heating the body to harden the binder.

7. The method of making endless friction facings which comprises winding a strip of woven fabric, treated with a heat hardenable binder, and provided with metallic wires associated with at least some of the strands thereof, said strip having recessed and projecting portions on opposite sides thereof such that the projections of the fabric nest with recesses of adjacent convolutions of the body formed thereby and subjecting said body to pressure to compact the same and to interlock the metallic strands of adjacent convolutions with each other and heat the body to harden the binder.

8. The method of making endless friction facings which comprises winding a strip of fabric treated with a hardenable binder and having previously shaped recessed and projecting portions on opposite sides thereof into a body such that the projections of the fabric nest with recesses of adjacent convolutions and subjecting said body to simultaneous heat and pressure to harden the binder and compact the body into a substantially rigid friction facing.

9. The method of making endless friction facings which comprises folding a strip of woven fabric having metallic wires associated with at least some of the strands thereof, and having a heat hardenable binder, along a longitudinal line into angular cross section, winding the thus shaped fabric so that the convolutions thereof inter-nest with each other to form a body and thereafter subjecting the body to pressure whereby to cause the metallic strands to be deformed and interlocked with metallic strands of adjacent convolutions and heating the body to cause the binder to harden.

10. The method of making endless friction facings which comprises the steps of winding a strip of fabric, treated with a thermo-setting binder in a thermo-plastic condition and shaped to provide inter-nesting relationship adjacent convolutions thereof, introducing the body thus formed into a mold and applying heat sufficient to plasticize the binder and pressure to consolidate the convolutions of the body into an approximate shape, withdrawing the thus heated body from the mold and introducing it into a zone for continued heat treatment to increase the infusible state of the binder.

11. An endless friction element comprising a body composed of a strip of fabric, the convolutions of which are secured together in an inter-nested relationship and provided with a heat hardened binder, said element being compressed to consolidate the convolutions upon each other to form a substantially rigid friction facing.

12. An endless friction element comprising a strip of woven fabric having metallic wires associated with at least some of the strands thereof and having recessed and projecting portions on opposite sides thereof with the projections of the fabric nesting with recesses of adjacent convolutions whereby to form an inter-fitting relationship between the convolutions, said strip being treated with a heat hardenable binder, said element being compressed to shape transversely of said convolutions to cause the metallic strands of adjacent convolutions to inter-lock with each other and to form a substantially rigid friction element, and being heated to harden said binder.

13. An endless friction element comprising a body composed of a strip of fabric, the convolutions of which are secured together in an inter-nested relation and provided with a heat hardened binder, a filler in said element, at least a portion of said filler being exposed at the working surface thereof, said element being compressed to consolidate the convolutions upon each other to form a substantially rigid friction facing.

14. An endless friction element comprising a body composed of a strip of fabric, the convolutions of which are secured together in an inter-nested relation and provided with a heat hardened binder, a metallic filler in said element, at least a portion of said metallic filler being exposed at the working face thereof, said element being compressed to consolidate the convolutions upon each other to form a substantially rigid friction facing.

OSBORN H. CILLEY.

DISCLAIMER 2,096,692.—*Osborn H. Cilley*, Lancaster, Pa. FRICTION MEMBER AND PROCESS OF MAKING THE SAME. Patent dated October 19, 1937. Disclaimer filed March 1, 1940, by the inventor; the assignee, *Raybestos-Manhattan, Inc.*, assenting.

Hereby enters this disclaimer to claims 6, 7, 8, 11, 12, and 13 of the patent.
[*Official Gazette March 26, 1940.*]

a suitable thermo-setting binder in a thermoplastic condition into chevron form in cross section, loosely winding said folded strip in spiral fashion to form a loosely coiled annulus, subjecting said coil to heat and pressure to plasticize the binder and consolidate the convolutions of the coiled annulus, and curing said coil to set the binder.

4. A friction element comprising a spiral coil of binder-treated fabric folded longitudinally into chevron form in cross section, the lateral portions of the successive layers being disposed at an acute angle to the faces of said element, the coil being compressed and the binder cured to a substantially infusible state.

5. A friction element comprising a spiral coil of binder treated fabric folded longitudinally into chevron form in cross section, the lateral portions of the successive layers being disposed at an acute angle to the faces of said element, whereby no potential or incipient planes of cleavage are provided directly through the body of the element, the coil being compressed and the binder cured to a substantially infusible state.

6. The method of making endless friction facings which comprises winding a strip of fabric, treated with a heat hardenable binder, and having previously shaped recessed and projecting portions on opposite sides thereof into a body such that the projections of the fabric nest with recesses of adjacent convolutions and subjecting the body to pressure to compact the convolutions thereof into a substantially rigid friction facing and heating the body to harden the binder.

7. The method of making endless friction facings which comprises winding a strip of woven fabric, treated with a heat hardenable binder, and provided with metallic wires associated with at least some of the strands thereof, said strip having recessed and projecting portions on opposite sides thereof such that the projections of the fabric nest with recesses of adjacent convolutions of the body formed thereby and subjecting said body to pressure to compact the same and to interlock the metallic strands of adjacent convolutions with each other and heat the body to harden the binder.

8. The method of making endless friction facings which comprises winding a strip of fabric treated with a hardenable binder and having previously shaped recessed and projecting portions on opposite sides thereof into a body such that the projections of the fabric nest with recesses of adjacent convolutions and subjecting said body to simultaneous heat and pressure to harden the binder and compact the body into a substantially rigid friction facing.

9. The method of making endless friction facings which comprises folding a strip of woven fabric having metallic wires associated with at least some of the strands thereof, and having a heat hardenable binder, along a longitudinal line into angular cross section, winding the thus shaped fabric so that the convolutions thereof inter-nest with each other to form a body and thereafter subjecting the body to pressure whereby to cause the metallic strands to be deformed and interlocked with metallic strands of adjacent convolutions and heating the body to cause the binder to harden.

10. The method of making endless friction facings which comprises the steps of winding a strip of fabric, treated with a thermo-setting binder in a thermo-plastic condition and shaped to provide inter-nesting relationship adjacent convolutions thereof, introducing the body thus formed into a mold and applying heat sufficient to plasticize the binder and pressure to consolidate the convolutions of the body into an approximate shape, withdrawing the thus heated body from the mold and introducing it into a zone for continued heat treatment to increase the infusible state of the binder.

11. An endless friction element comprising a body composed of a strip of fabric, the convolutions of which are secured together in an inter-nested relationship and provided with a heat hardened binder, said element being compressed to consolidate the convolutions upon each other to form a substantially rigid friction facing.

12. An endless friction element comprising a strip of woven fabric having metallic wires associated with at least some of the strands thereof and having recessed and projecting portions on opposite sides thereof with the projections of the fabric nesting with recesses of adjacent convolutions whereby to form an inter-fitting relationship between the convolutions, said strip being treated with a heat hardenable binder, said element being compressed to shape transversely of said convolutions to cause the metallic strands of adjacent convolutions to inter-lock with each other and to form a substantially rigid friction element, and being heated to harden said binder.

13. An endless friction element comprising a body composed of a strip of fabric, the convolutions of which are secured together in an inter-nested relation and provided with a heat hardened binder, a filler in said element, at least a portion of said filler being exposed at the working surface thereof, said element being compressed to consolidate the convolutions upon each other to form a substantially rigid friction facing.

14. An endless friction element comprising a body composed of a strip of fabric, the convolutions of which are secured together in an inter-nested relation and provided with a heat hardened binder, a metallic filler in said element, at least a portion of said metallic filler being exposed at the working face thereof, said element being compressed to consolidate the convolutions upon each other to form a substantially rigid friction facing.

OSBORN H. CILLEY.

DISCLAIMER 2,096,692.—*Osborn H. Cilley*, Lancaster, Pa. FRICTION MEMBER AND PROCESS OF MAKING THE SAME. Patent dated October 19, 1937. Disclaimer filed March 1, 1940, by the inventor; the assignee, *Raybestos-Manhattan, Inc.*, assenting.

Hereby enters this disclaimer to claims 6, 7, 8, 11, 12, and 13 of the patent.
[*Official Gazette March 26, 1940.*]

DISCLAIMER 2,096,692.—*Osborn H. Cilley*, Lancaster, Pa. FRICTION MEMBER AND PROCESS OF MAKING THE SAME. Patent dated October 19, 1937. Disclaimer filed March 1, 1940, by the inventor; the assignee, *Raybestos-Manhattan, Inc.*, assenting.

Hereby enters this disclaimer to claims 6, 7, 8, 11, 12, and 13 of the patent.

[*Official Gazette March 26, 1940.*]